July 17, 1923.  1,462,033
R. V. FARNHAM
DISINFECTOR ATTACHMENT FOR THE FLUSHING ARRANGEMENTS OF WATER CLOSETS AND THE LIKE
Filed Nov. 11, 1922
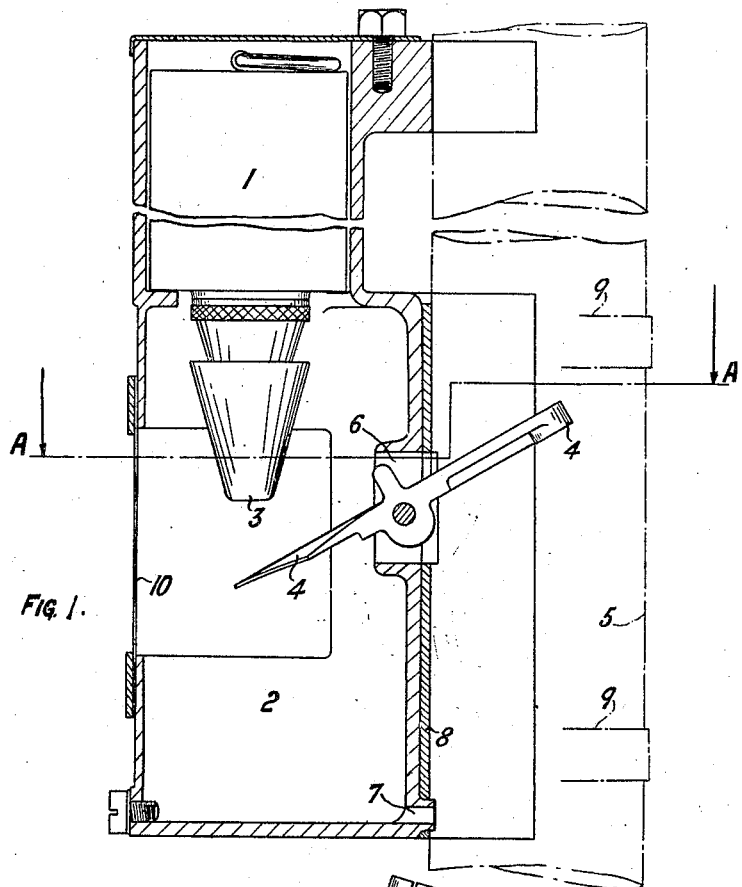
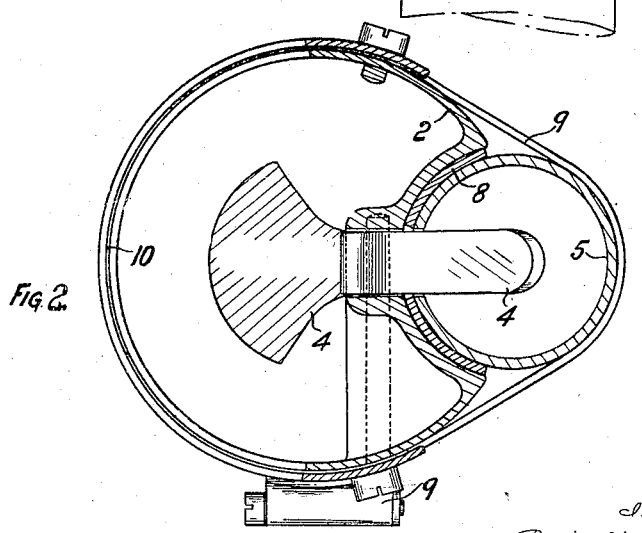

Patented July 17, 1923.

1,462,033

UNITED STATES PATENT OFFICE.

REGINALD VANDEZEE FARNHAM, OF SKELMORLIE, SCOTLAND.

DISINFECTOR ATTACHMENT FOR THE FLUSHING ARRANGEMENTS OF WATER-CLOSETS AND THE LIKE.

Application filed November 11, 1922. Serial No. 600,203.

*To all whom it may concern:*

Be it known that I, REGINALD VANDEZEE FARNHAM, a subject of the King of the United Kingdom of Great Britain and Ireland, and residing at Skelmorlie, Ayrshire, Scotland, have invented a certain new and useful Improvement in Disinfector Attachments for the Flushing Arrangements of Water-Closets and the like, of which the following is a specification.

This invention relates to disinfector attachments for the flushing arrangements of water closets and the like of the type comprising a container for the disinfectant, a mixing chamber, a valve device for permitting a quantity of disinfectant to pass from the container to the mixing chamber, a pivoted lever for operating said valve, one end of which projects into the flushing pipe and is depressed by the main flushing stream, and the other end of which contacts with and operates the valve, the end of the lever which projects into the flushing pipe also serving to deflect a quantity of water into the mixing chamber, an inlet near the top of the mixing chamber through which a quantity of water deflected by the lever is admitted to the mixing chamber and an outlet from the mixing chamber at the bottom thereof for the mixture to pass out into the flushing pipe.

Attachments of this type as constructed heretofore are adapted to be secured to the flushing pipe by a process of sweating.

The present invention is characterized primarily by the feature that the external wall of the mixing chamber is shaped to conform with the curvature of the flushing pipe and is associated with a deformable washer for interposition between the shaped surface and the pipe, the washer being ported to correspond with the ports in the mixing chamber and those to be formed in the pipe and being adapted to be nipped between the mixing chamber and the pipe by a suitable clip or clips embracing the pipe and partly or wholly embracing the mixing chamber.

The invention is illustrated in the accompanying drawings in which Fig. 1 is a transverse section, and Fig. 2 a section on the line A—A of Fig. 1.

The disinfector attachment shown comprises a container 1 for the disinfectant, a mixing chamber 2, and a valve device 3 for permitting a quantity of disinfectant to pass from the container 1 to the mixing chamber 2. For operating the valve 3 there is provided a lever 4 one end of which projects into the flushing pipe 5 and is depressed by the main flushing stream, and the other end of which contacts with and operates the valve 3, the end of the lever which projects into the flushing pipe also serving to deflect a quantity of water into the mixing chamber 2. An inlet 6 is formed near the top of the mixing chamber 2 through which inlet a quantity of water deflected by the lever 4 is admitted to the mixing chamber 2 and an outlet 7 is formed at the bottom of the mixing chamber for the mixture to pass out into the flushing pipe after the flushing operation. The external wall of the mixing chamber 2 is shaped to conform with the curvature of the flushing pipe 5. A deformable washer 8 is disposed between the shaped surface and the pipe. The washer is ported to correspond with the inlet 6 and the outlet 7 and with the ports in the pipe 5. The washer is adapted to be nipped between the mixing chamber 2 and the pipe by clips 9 embracing the pipe 5 and embracing the mixing chamber 2.

The outlet 7 is formed as a nozzle adapted for insertion into the flushing pipe 5, the nozzle serving as a locating pin for ensuring that the ports in the washer, the ports in the flushing pipe and the ports in the mixing chamber are in proper register.

The lever 4 is formed with a baffle which prevents excessive inrush of water to the mixing chamber 2.

The mixing-chamber-end of the lever is of fish tail formation so that the inrushing water will be directed on to the transparent sheet 10 which closes the opening through which the disinfectant is viewed.

I claim:—

Disinfector attachment for the flushing arrangements of water closets and the like, comprising, in combination, a container for the disinfectant, a mixing chamber having its external wall shaped to conform with the curvature of the flushing pipe, a valve device for permitting a quantity of disinfectant to pass from said container to said mixing chamber, a pivoted lever for operating said valve, one end of which lever projects into the flushing pipe and is depressed by the main flushing stream, and the other end of which contacts with and operates the valve, the end of said lever which projects into the flushing pipe also serving to deflect a quantity of water into the mixing chamber, an inlet near the top of the mixing chamber through which a quantity of water deflected by the lever is admitted to the mixing chamber, an outlet from the mixing chamber at the bottom thereof for the mixture to pass out into the flushing pipe, a deformable washer for interposition between said shaped wall and said flushing pipe, said washer being ported to correspond with the inlet and outlet of the mixing chamber and ports formed in the pipe, and clipping means embracing the pipe and embracing said mixing chamber so as to nip the washer between said shaped wall and said pipe.

In testimony whereof I have signed my name to this specification in the presence of two subscribing witnesses.

REGINALD VANDEZEE FARNHAM.

Witnesses:
 ISABEL ROLLS,
 HELEN CRAIG.